March 11, 1958  R. C. RIKE ET AL  2,826,042
BRAKE BOOSTER MECHANISM

Filed Oct. 18, 1954  3 Sheets-Sheet 1

INVENTOR.
RICHARD C. RIKE
BY JAMES O. HELVERN

Craig V. Morton
ATTORNEY

March 11, 1958

R. C. RIKE ET AL 2,826,042

BRAKE BOOSTER MECHANISM

Filed Oct. 18, 1954

INVENTOR.
RICHARD C. RIKE
BY JAMES O. HELVERN

Craig V. Montons
ATTORNEY

March 11, 1958 R. C. RIKE ET AL 2,826,042
BRAKE BOOSTER MECHANISM
Filed Oct. 18, 1954 3 Sheets-Sheet 3
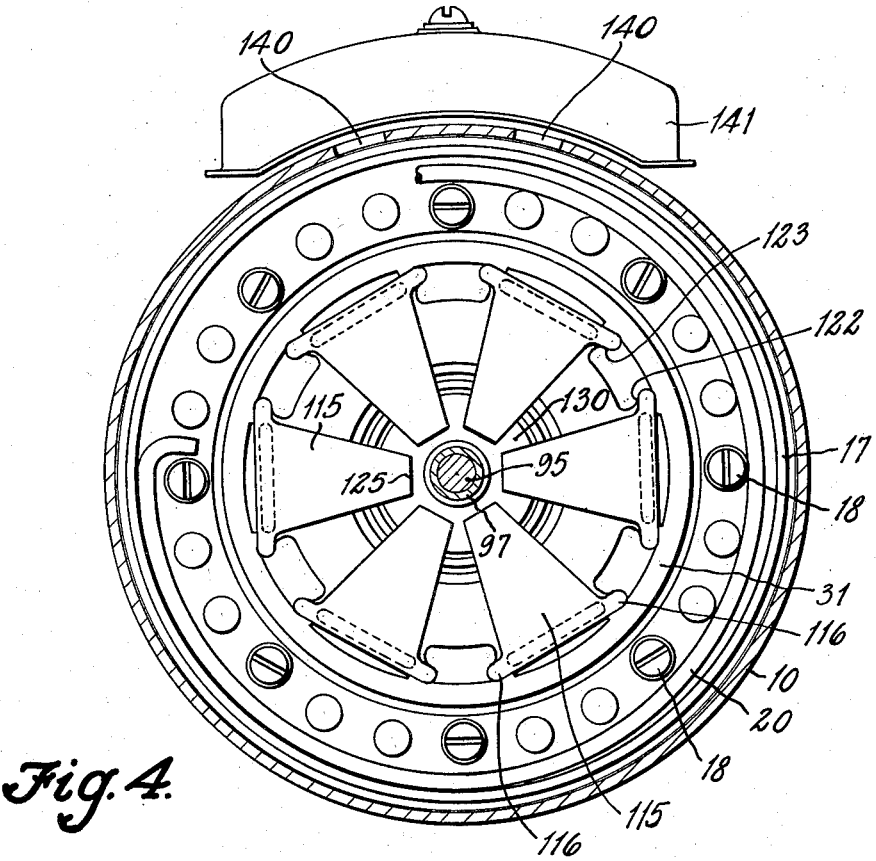
Fig. 4.
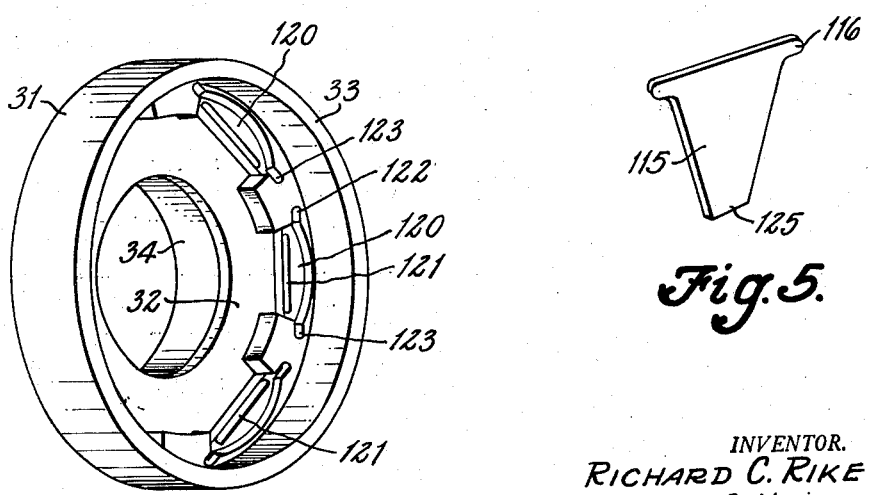
Fig. 5.
Fig. 6.
INVENTOR.
RICHARD C. RIKE
BY JAMES O HELVERN
Craig V. Morton
ATTORNEY ated on one side. Of the piston, no difficulty occurs with such brake booster mechanisms. However, when vacuum power fails, or the brake booster fails to operate for any reason, then it is necessary for the operator of the vehicle not only to operate the fluid displacement member by direct manual power but also to operate the brake booster mechanism which adds to the pedal effort required for operation of the fluid displacement member. The added pedal effort required for operation of the brake booster mechanism is the result of the compression of a relatively heavy return or retraction spring that normally retains the power piston at one end of its stroke of operation and the compression of gaseous fluid within the brake booster mechanism on the side of the power piston that normally would be evacuated by connection with the source of vacuum power.

2,826,042

BRAKE BOOSTER MECHANISM

Richard C. Rike, Dayton, and James O. Helvern, Lewisburg, Ohio, assignors to General Motors Corporation, a corporation of Delaware Application October 18, 1954, Serial No. 462,649

11 Claims. (Cl. 60—54.6)

This invention relates to a brake booster mechanism adapted for use on motor vehicles and particularly in operable association with the hydraulic brake system of motor vehicles.

The purpose of brake booster mechanisms currently used on motor vehicles is to aid the operator in application of the brakes to such an extent that much less pedal effort is required than when such brake booster mechanisms are not used, many of the booster mechanisms utilizing a source of power less than atmospheric, particularly vacuum, that is obtained from the engine manifold of the motor vehicle. So long as a source of vacuum is available, the brake booster mechanisms are power actuated to give the operator the benefit of power actuation of the brakes of the motor vehicle.

However, there are times when the source of vacuum fails, as when the engine stalls, or when the engine is stopped by the operator. At these times there is no source of vacuum available in the engine manifold for power actuation of the brake booster mechanism. To meet these conditions it is a common practice to utilize vacuum reservoirs and auxiliary vacuum pumps to supply a source of vacuum at times when the vehicle engine is inactive.

Regardless of these safety factors there are still times when vacuum power fails, and under these circumstances it is necessary for the operator of the vehicle to actuate the brakes by direct pedal action without the aid of the brake booster mechanism. The conventional booster mechanisms are structurally arranged that in the event the source of vacuum fails, the operator is able to directly actuate the master cylinder of the hydraulic brake system and obtain braking action on the vehicle.

However, without the aid of the brake booster mechanism, such direct manual actuation of the brake system through the intermediary of the brake booster mechanism requires an extra pedal effort on the part of the operator. In many instances the pedal effort required at these times is greater than the pedal effort that would be required in conventional hydraulic brake systems without the use of a brake booster mechanism. Such pedal effort may result in a condition of surprise to the operator which should be avoided under all circumstances. It is desirable therefore that when vacuum power fails for power actuation of a brake booster mechanism that direct actuation of the hydraulic brake system shall be such as not to require substantially more pedal effort than would be required should the brake booster mechanism not be associated with the brake system. That is, the brake action should be as "soft" as possible to provide for sufficient actuation of the hydraulic brake system to give satisfactory brake control over the motor vehicle even though the brake booster mechanism may for some reason have failed to operate.

It is common practice in conventional brake booster mechanisms to provide a fluid motor that includes a power piston operated by a pressure differential effective on opposite sides of the piston. Connected with the power piston of the booster mechanism there is provided a fluid displacement member that operates within the master cylinder of a hydraulic brake system. A follow-up control valve to regulate the pressure existent on both sides of the power piston is actuated by a manually operated member that is connected with the brake pedal of the motor vehicle. This valve mechanism is usually provided with a structure that engages the fluid displacement member that is operable in the master cylinder so that in the event power actuation of the power piston should fail there is a direct connection provided between the follow-up control valve and the fluid displacement member to obtain direct pedal actuated operation of the fluid displacement member in the master cylinder.

So long as vacuum power is available for obtaining a pressure differential on opposite sides of the power piston, atmospheric pressure being existent on one side of the piston, no difficulty occurs with such brake booster mechanisms. However, when vacuum power fails, or the brake booster fails to operate for any reason, then it is necessary for the operator of the vehicle not only to operate the fluid displacement member by direct manual power but also to operate the brake booster mechanism which adds to the pedal effort required for operation of the fluid displacement member. The added pedal effort required for operation of the brake booster mechanism is the result of the compression of a relatively heavy return or retraction spring that normally retains the power piston at one end of its stroke of operation and the compression of gaseous fluid within the brake booster mechanism on the side of the power piston that normally would be evacuated by connection with the source of vacuum power.

It is therefore an object of this invention to provide a brake booster mechanism in which the operation of a fluid displacement member in the master cylinder associated with the brake booster mechanism is completely independent of the main power piston of the brake booster mechanism so that the main power piston can be completely inactive with the fluid displacement member being directly operated by manual pedal operation so as to relieve the operator of the necessity of actuating the main power piston concurrently with operation of the fluid displacement member when vacuum power should fail to effect the power operation of the brake booster mechanism or the booster mechanism should fail of operation for any other reason.

It is another object of the invention to provide a brake booster mechanism that will accomplish the result of the foregoing object wherein the main power piston of the brake booster mechanism is composed of two primary elements one of which is the power piston itself and the other is a movable wall structure that carries a follow-up valve mechanism for actuation of the booster mechanism as well as the displacement member for operation in the master cylinder, this wall structure also being adapted to support a lever system to effect operation of the fluid displacement member concurrently with operation of the main power piston and provide for transmission of hydraulic reaction from the master cylinder to the follow-up valve mechanism and thus to the manually operated pedal actuated member for operating the follow-up valve control mechanism to give a brake feel to the operator of the vehicle.

Further objects and advantages of the present invention will be apparent from the following description, reference being had to the accompanying drawings wherein a preferred form of the invention is clearly shown.

In the drawings:

Figure 4 is a transverse cross sectional view taken along line 4—4 of Figure 2.

Figure 5 is a perspective view of one of the parts of the reaction mechanism of the brake booster.

Figure 6 is a perspective elevational view of the structure for supporting the reaction elements illustrated in Figure 5.

Figure 1:
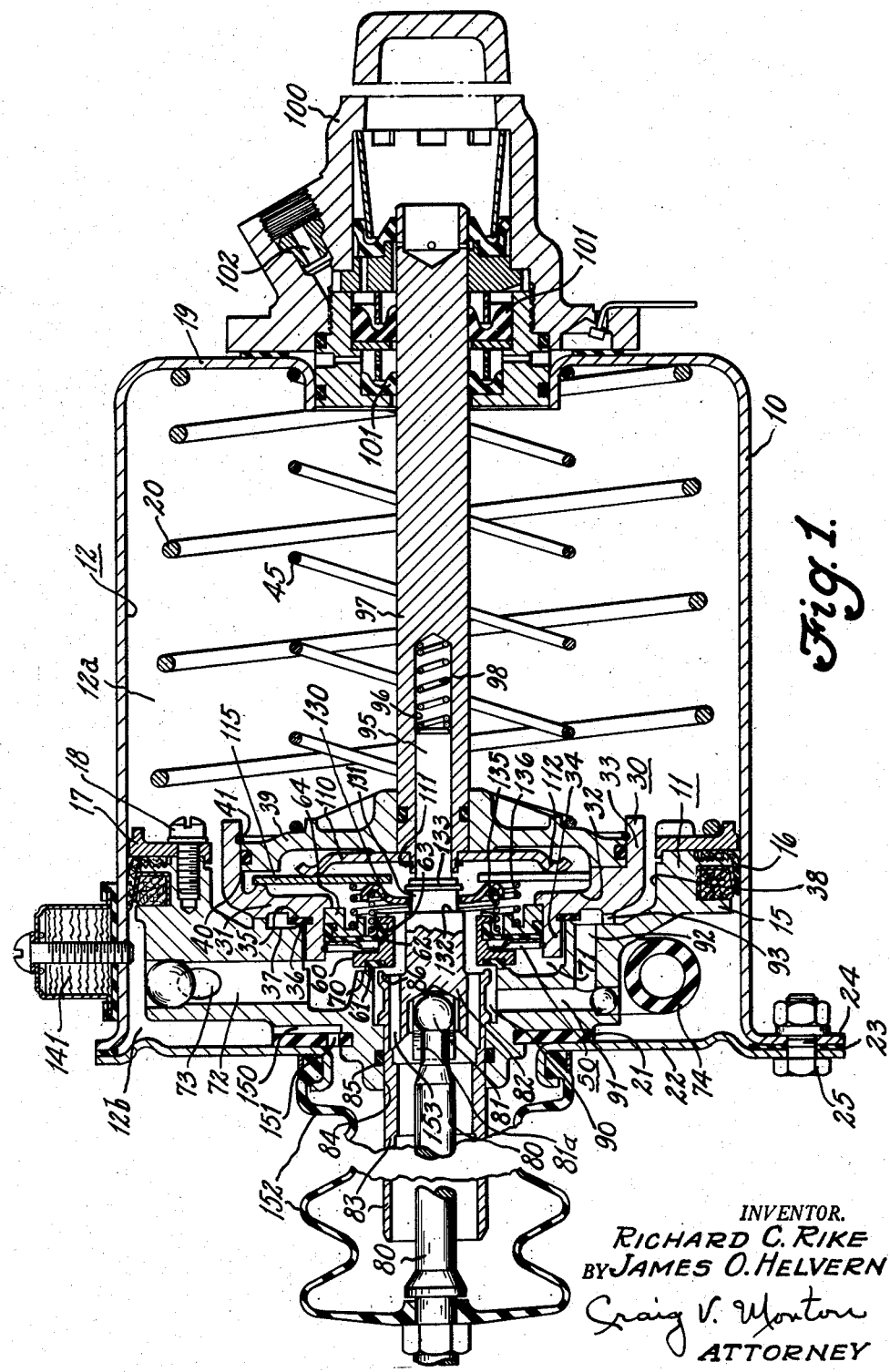
Figure 1 is a longitudinal cross sectional view of a brake booster mechanism incorporating features of this invention.

In this invention the brake booster mechanism is similar in many respects to that disclosed and described in the copending application of Richard C. Rike, Serial Number 462,648, filed October 18, 1954, the invention disclosed and described herein constituting an improvement over the apparatus disclosed and described in the aforementioned application.

In this invention the brake booster mechanism comprises a casing 10 that has a piston unit 11 slidably disposed in the chamber 12 for reciprocation therein. The piston unit 11 divides the chamber 12 into two compartments 12a and 12b.

The piston unit 11 comprises a generally circular body 15 that has a seal structure 16 disposed between the body 15 and the wall 12 of the housing 10 to prevent leakage of fluid between the chambers 12a and 12b. The piston body 15 carries an annular plate 17 that retains the seal structure 16 in place on the body 15, suitable cap screws 18 securing the plate 17 to the body 15. Between the plate 17 and the end wall 19 of the chamber 12a, there is a heavy return or retraction spring 20 that normally retains the piston unit 11 in the position shown in Figure 1, the resilient bumper pad 21 engaging the end closure wall 22 that closes the open end of the chamber 12b. A suitable gasket 23 is provided between the closure wall 22 and the flange 24 of the housing 10 to close the chamber end, suitable bolts 25 retaining the elements together.

The piston unit 11 supports a movable wall portion 30 that normally engages the body 15 as shown in Fig. 1. Thus the piston unit 11 is composed of two coaxially arranged members comprising the piston body 15 and the generally circular movable wall structure 30.

The movable wall structure 30 comprises a first body member 31 that has a radially disposed body portion 32 that terminates at the outer periphery in an axially extending flange 33. The inner periphery of the radial wall 32 terminates in an axial flange 34 disposed in opposite direction to the flange 33. The radial wall 32 of the movable wall structure 30 is provided with an annular resilient seal member 35 that engages a seal face 36 provided on the bottom wall 37 of a recess 38 provided in one face of the body portion 15 of the piston unit.

The movable wall structure 30 includes a disk shaped wall member 39 that is supported within the flange 33 of the wall member 31 against a suitable shoulder 40. A snap ring 41 retains the wall member 39 in position in the wall member 31.

A compression spring 45 is placed between the movable wall structure 30 and the end wall 19 of the casing 10 to retain the movable wall structure 30 normally in engagement with the body 15 of the piston unit 11, with the resilient seal 35 against the seal face 36.

A follow-up control valve structure 50 is carried by the movable wall structure 30 and is disposed generally within the axial opening formed by the flange 34 of the movable wall structure 30. The follow-up control valve 50 comprises an annular movable valve element 60 that has a resilient annular valve member 61 on one face thereof. The movable valve member 60 is supported by a flexible diaphragm support element 62 that has an inner peripheral end 63 engaging the valve element 60 and an outer peripheral end 64 engaging the inner surface of the flange 34 of the movable wall structure 30. Thus the valve element 60 floats coaxially in the opening provided by the annular flange 34.

The resilient annular member 61 on the valve element 60 engages a valve face 70 on the piston element 11. The cooperation of the valve element 61 and the valve face 70 closes a passage therebetween from a chamber 71 provided by the cooperation of the wall portion 31 of the movable wall structure 30 and an annular recess in the piston body 15.

The chamber 71 is adapted for connection with a suitable source of pressure less than atmosphere, preferably vacuum, by means of a radial passage 72 that has an outlet port 73 connected with a flexible connecting line 74 that connects with a fitting, not shown, in the casing 10 that in turn is connected with the manifold of the motor vehicle engine for supply of a vacuum source to the chamber 71.

A manually operable member 80 that is connected with the brake pedal, not shown, of a motor vehicle by any suitable lever mechanism has the end 81 thereof connected by a clip 81a with a valve operating member 82 that has a tubular extension 83 to the left hand side thereof as viewed in Fig. 1 slidable in an opening 84 provided in the body 15 of the piston unit. An O ring seal 85 prevents fluid leakage at the sliding joint.

The valve operating member 82 has an annular valve face 86 adapted for engagement with the resilient seat 61 to close the passage therebetween against admission of atmospheric air into the chamber 90 at certain times of operation of the mechanism hereinafter described.

The chamber 90 in the valve body 15 is connected by means of the radial passage 91, the passage 92 and the port 93 with the right hand side of the piston unit 11, as viewed in Figure 1.

The right hand end of the valve actuating element 82 has a reduced diameter stem portion 95 that slides within an axial bore 96 in a fluid displacement member 97. A spring 98 between the end of the reduced diameter portion 95 and the end of the bore 96 positions the valve actuating element 82 in the position shown in Fig. 1 when the brake booster mechanism is inactive.

The fluid displacement member 97 has the forward end thereof disposed within a master cylinder 100, a multiple seal structure 101 being provided between the displacement member 97 and the master cylinder 100 to slidably receive the displacement member 97 in its reciprocal movement within the master cylinder 100.

The master cylinder 100 is provided with a fluid pressure outlet, not shown, through which displaced fluid is discharged under pressure into the hydraulic lines of a conventional hydraulic brake system of a motor vehicle. A residual pressure check valve, not shown, is provided in the discharge port from the master cylinder 100 to allow free flow of fluid under pressure into the hydraulic lines of the brake system of the motor vehicle upon entry of the displacement member 97 into the master cylinder, and to hold a fixed residual pressure in the lines of the hydraulic brake system upon release of the brakes, this being a conventional arrangement in systems of this kind. A port 102 is provided in the master cylinder 100 that is connected with a hydraulic fluid reservoir for supply of fluid to the master cylinder 100 to make up for leakage, in conventional manner. The master cylinder 100 is bolted to the end wall 19 of the casing 10 in any suitable manner.

The left hand end of the fluid displacement member 97 carries a first reaction disk or reaction element 110 that is secured on the end of the displacement member 97 by means of a snap ring 11. Near the outer periphery of the disk shaped reaction element 110 there is formed an annular ridge or ring 112 that provides a pivot ring engaging one side of a plurality of reaction plates or fingers 115 that are pivotally carried on the wall member 31 of the movable wall structure 30. Each of the reaction plates 115 is substantially T shaped as shown in Figure 5, the head 116 of the reaction plates 115 providing the means by which the plates are pivotally supported on the wall member 31 of the movable wall structure 30.

Figure 3:
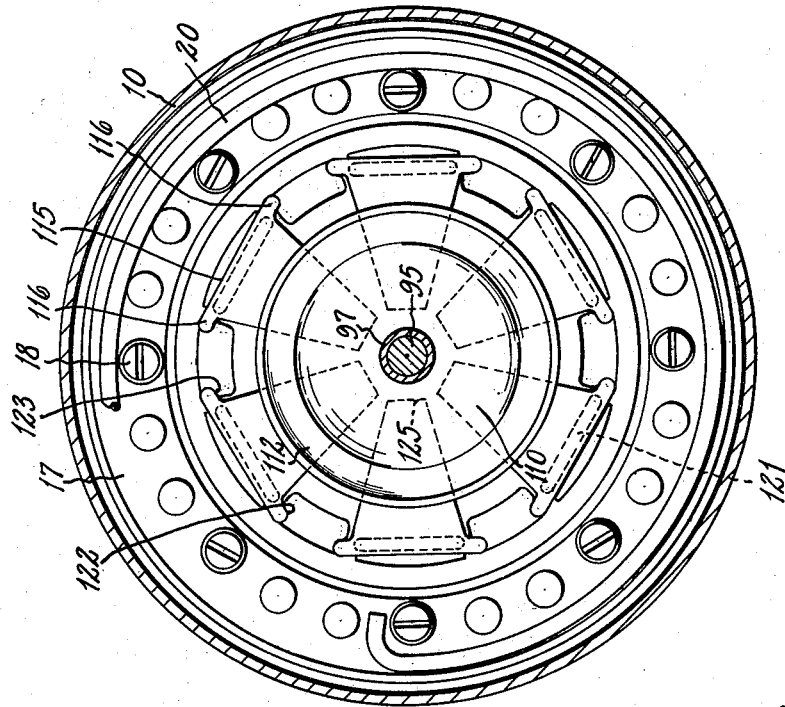
Figure 3 is a transverse cross sectional view taken along line 3—3 of Figure 2.

The wall member 31 is more specifically illustrated in Figure 6. The wall member 31 has a plurality of recesses 120 each of which has a ridge 121 in the bottom wall of the recess 120. Extending transversely from each of the recesses 120 are the notches 122 and 123 that receive the ends of the head 116 of the T shaped reaction plate 115. The reaction plates 115 are positioned radially about the axis of the wall member 31 as shown in Figures 3 and 4 and are arranged in a common plane with their inner ends 125 engaging a second reaction element or disc 130 carried upon the reduced diameter portion 131 of the valve operating element 82, as shown in Figure 1. The reaction element 130 is provided with axial movement on the reduced diameter portion 131, being adapted to engage a shoulder 132 on the member 82 and being retained on the reduced diameter portion 131 by a snap ring 133.

A compression spring 135 is placed between the reaction element 130 and the inner peripheral end 63 of the flexible diaphragm 62 to retain the reaction element 130 in engagement with the reaction plates 115 and to retain the reaction element 130 in spaced relationship relative to the shoulder 132 when the brake booster mechanism is inactive, as shown in Figure 1. This spring 135 also retains the resilient valve seat 61 in engagement with the valve face 70 on the piston body 15 to retain the chamber 71 closed.

A second compression spring 136 is placed between the reaction plates 115 and the outer end 64 of the diaphragm retainer to retain the reaction plates against the pivot ring 112 of the reaction member 110.

The casing 10 is provided with a plurality of air inlet openings 140 that are covered by an air filter 141, atmospheric air thus normally being retained in the chamber 12b of the casing 10.

*Operation*

The normal inactive position of the elements of the brake booster mechanism are as shown in Figure 1. With the elements in this position atmospheric air enters the chamber 12b through the air filter 141. The air passes through one of the passages 150 provided in the piston body 15 and thence through one or more holes 151 in the rubber bumper 21. From here the air passes into the rubber boot 152 and from thence into the inside bore of the sleeve 83 through the passage 153 and the valve operating member 82 into the chamber 90 and from thence through the passages 91 and 93 to the right hand side of the piston unit 11. The brake booster mechanism is therefore of the type known as an air suspended unit, atmospheric air being present in both chambers 12a and 12b when the booster is inactive.

When the brake booster is rendered active by operation of the brake pedal, the manually operable member 80 is moved in a right hand direction, as viewed in Figure 1. The first movement of the member 80 closes the valve face 86 upon the resilient seat 61 thereby closing off chamber 90 from atmospheric air from the passages 153. At this time the only resistance to movement of the manually operated member 80 is that occasioned by the very light compression spring 98. Further movement of the valve operating member 82 in a right hand direction will cause the resilient valve seat 61 and the valve face 70 to connect the chamber 90 with a source of vacuum existent in chamber 71 as supplied through the flexible line 74 and the passage 72. Chamber 12a of the booster mechanism will be evacuated through the passages 93, 91, chamber 90 that is now connected with the vacuum chamber 71.

Since atmospheric pressure now stands only in chamber 12b on the left hand side of the piston unit 11, the piston unit 11 will be moved in a right hand direction against the return spring 20. Up to this time the only resistance to movement of the manually operable member 80 is still the light resistance of the spring 98. Since there is a pressure differential on piston unit 11 the piston body 15 will carry the movable wall structure 30 in a right hand direction against the resistance of the spring 45 so that the body 15 and the movable wall structure 30 move as a unit so long as a pressure differential exists on opposite sides of the piston unit 11.

As the piston unit 11 begins movement in a right hand direction the displacement member 97 will place the hydraulic fluid in the master cylinder 100 under pressure and discharge the same under pressure into the brake lines of a conventional hydraulic brake system on the motor vehicle. The hydraulic fluid under pressure in the master cylinder 100 causes a reaction against the end of the displacement member 97 urging it in a left hand direction. This reaction of the hydraulic fluid is thus transmitted through the displacement member 97 to the reaction element 110 that engages the reaction plates 115 and through them in turn transmits the hydraulic reaction force to the reaction element 130 to move it against the shoulder 132 on the valve actuating member 82. With the reaction element 130 in engagement with the shoulder 132 the hydraulic reaction forces in the master cylinder 100 are transmitted to the manually operated member 80 and thus to the brake pedal of the vehicle to provide a brake feel that is proportioned to the forces on the piston unit 11 by the arrangement of the leverage action of the reaction elements 110 and 130 on the reaction plate 115.

In the event the source of vacuum should fail, direct manual actuation of the displacement member 97 will occur when the end of the reduced diameter portion 131 engages the left hand end of the displacement member 97. This does not occur normally, but only when the vacuum source fails, or the brake booster fails of operation for some other reason. Under this condition it is desirable that the pedal pressure required to operate the brakes shall not be substantially greater than that required when the brake booster operates to prevent an element of surprise to the operator of the vehicle.

The manual actuation of the brakes in which a brake booster is incorporated has commonly been provided with a "hard" pedal action because it has been necessary to move the main power piston against the action of a heavy retraction spring and also to compress the air in the chamber of the booster mechanism that normally is evacuated, or at least to displace the air through numerous intricate passages by compressing the air.

To overcome the "hard" pedal action, the brake booster of this invention provides for manual movement of the displacement member 97 without the necessity of moving the main power piston unit 11 against the retraction spring 20, and eliminates any possibility of requiring compressing of fluid in the chamber of the brake booster mechanism that normally is evacuated.

Figure 2:
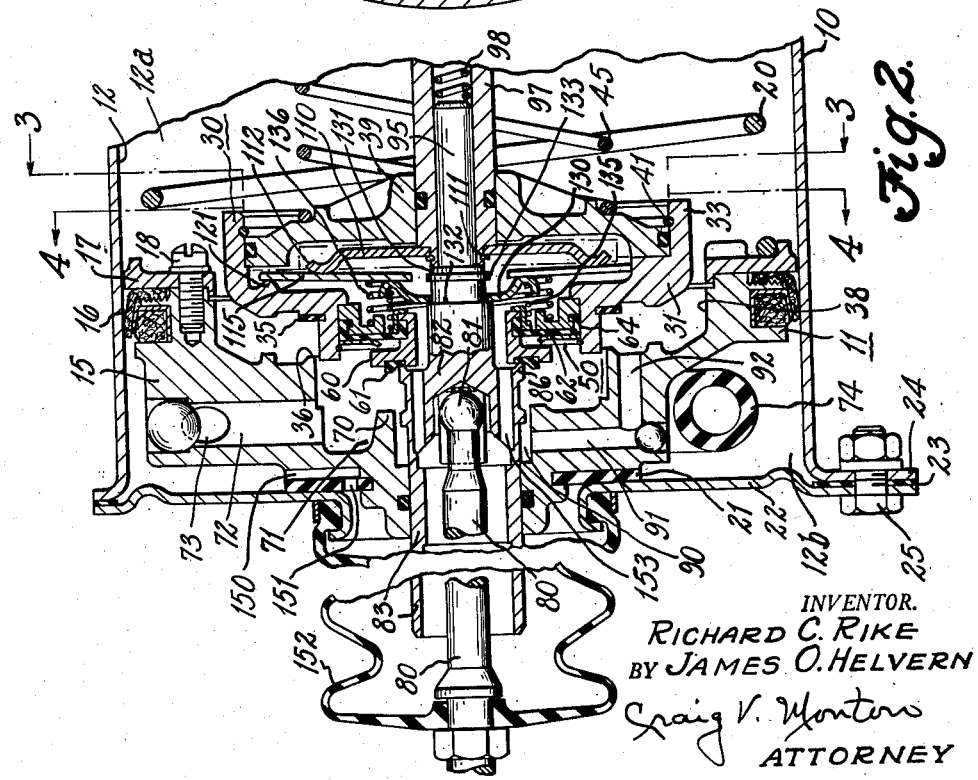
Figure 2 is a longitudinal cross sectional view of a portion of the brake booster mechanism similar to Figure 1 but illustrating the parts thereof in an actuating position.

The operation of the brake booster under conditions when a source of vacuum fails is illustrated in Fig. 2. The elements of the brake booster are illustrated in Fig. 2 in a position in which the brakes are under manual operation, that is vacuum power has failed and the operator of the vehicle has moved the manually operated member 80 in a right hand direction in the same manner as heretofore described with reference to Figure 1. It will be noted that the valve operating member 82 under this condition engages the resilient valve seat 61 to close off the supply of atmospheric air to the chamber 90 in the same manner as before. Also the valve seat 61 has been moved away from the valve face 70 to interconnect the chamber 90 with the chamber 71. Under normal conditions, with a vacuum source available, the piston body 15 would have moved in a right hand direction as previously described with reference to Figure 1. But since the vacuum source is not available under the conditions shown in Figure 2, there is no pressure differential existing in the chambers 12a and 12b which would cause movement of the piston body 15 in a right hand direction. Thus the piston body 15 is in effect stationary at this time as retained by the return or retraction spring 20.

However, the valve operating element 82, under manual operation of the member 80 has caused the wall structure 30 to move in a right hand direction with the fluid displacement member 97 and thereby carry the follow-up control valve and the brake feel reaction elements with the movable wall structure 30. Since the return spring 20 is not compressed under this condition, and since fluid can readily flow from chamber 12a of the casing 10 around the movable wall 30 from the right hand side to the left hand side thereof and by-pass the follow-up valve mechanism, there is no compression of fluid developed in the housing 10 even though chamber 12a of the casing 10 is not evacuated under this condition. The only resistance to movement of the wall structure 30 is the relatively light spring 45. This is of course in addition to the reaction forces of the hydraulic fluid that is under pressure in the master cylinder 100 acting on the end of the displacement member 97. The hydraulic reaction forces are now being transmitted directly to the manually operated member 80 from the fluid displacement member 97 since the member 97 and the valve actuating element 82 are in direct engagement.

While the form of embodiment of the invention as herein disclosed constitutes a preferred form, it is to be understood that other forms might be adopted as may come within the scope of the claims which follow.

What is claimed is as follows:

1. In a brake booster mechanism including a pressure fluid operated motor having a casing provided with a movable wall actuated by a pressure differential on opposite sides thereof, a master cylinder, a hydraulic fluid displacement member operable in the master cylinder and connected with said wall for actuation thereby, a follow-up valve mechanism having one position to establish equivalent pressures on opposite sides of the wall to inactivate the motor and a second position to establish differential pressures on opposite sides of the wall to activate the motor, manually operable means connected with said valve mechanism to activate the same for power activation of the motor and engageable with the displacement member to activate the same directly upon failure of power activation of the motor, the said movable wall including two separable wall portions one of which carries the said valve mechanism and the said displacement member and is separable from the other portion upon movement of the displacement member under manual actuation.

2. In a brake booster mechanism including a pressure fluid operated motor having a casing provided with a movable wall actuated by a pressure differential on opposite sides thereof, a master cylinder, a hydraulic fluid displacement member operable in the master cylinder and connected with said wall for actuation thereby, a follow-up valve mechanism having one position to establish equivalent pressures on opposite sides of the wall to inactivate the motor and a second position to establish differential pressures on opposite sides of the wall to activate the motor, manually operable means connected with said valve mechanism to activate the same for power activation of the motor and engageable with the displacement member to activate the same directly upon failure of power activation of the motor, the said movable wall including two separable wall portions one of which carries the said valve mechanism and the said displacement member resiliently retained in engagement with the other portion by spring means but which is separable from the said other portion against the action of the spring means upon movement of the displacement member under manual actuation.

3. A brake booster mechanism in accordance with claim 2 in which the said movable wall is a piston unit composed of the two separable wall portions.

4. In a brake booster mechanism including a pressure fluid operated motor having a casing provided with a movable wall actuated by a pressure differential on opposite sides thereof, a master cylinder, a hydraulic fluid displacement member operable in the master cylinder and connected with said wall for actuation thereby, a follow-up valve mechanism having one position to establish equivalent pressures on opposite sides of the wall to inactivate the motor and a second position to establish differential pressures on opposite sides of the wall to activate the motor, manually operable means connected with said valve mechanism to activate the same for power activation of the motor and engageable with the displacement member to activate the same directly upon failure of power activation of the motor, piston means forming said movable wall, said piston means including two separable coaxial inner and outer wall portions, spring means engaging said outer wall portion positioning the same normally at one end of the said casing, other spring means engaging said inner wall portion positioning the same resiliently normally against the said outer wall portion, said inner wall portion supporting said displacement member and movable therewith from said outer portion against only the resilience of the said other spring means on manual actuation of the said displacement member.

5. A brake booster mechanism in accordance with claim 4 in which the outer wall portion provides the main power piston of the booster mechanism and the spring means engaging the same provides the main return spring to position the power piston in normal inactive position at the said one end of the casing.

6. A brake booster mechanism in accordance with claim 4 in which the outer wall portion provides the main power piston of the booster mechanism and the spring means engaging the same provides the main return spring to position the power piston in normal inactive position at the said one end of the casing, and wherein the second mentioned spring means is of substantially less strength than the retraction spring means to provide only light resistance to movement of the inner wall portion and the displacement member.

7. A brake booster mechanism in accordance with claim 4 in which the separating movement of the inner wall portion relative to the outer wall portion of the piston means effects spatial separation of the inner wall portion from the outer wall portion providing thereby passage means for displacement of fluid from one side to the other of said inner wall portion without compression of the fluid by movement of the said inner wall portion relative to the outer wall portion.

8. A brake booster mechanism in accordance with claim 4 in which the separating movement of the inner wall portion relative to the outer wall portion of the piston means effects spatial separation of the inner wall portion from the outer wall portion providing thereby passage means for displacement of fluid from one side to the other of said inner wall portion without compression of the fluid by movement of the said inner wall portion relative to the outer wall portion, the said passage means providing a by-pass around the valve mechanism.

9. A brake booster mechanism comprising, a fluid pressure operated motor including a casing having a pressure differential responsive power piston unit reciprocable therein, spring means between said piston unit and one end of said casing positioning said piston unit normally toward one end of said casing, a master cylinder coaxially arranged on said casing, a hydraulic fluid displacement member operable in said master cylinder, an independent wall unit coaxial with said piston unit engaging the same for movement therewith and also separable therefrom for movement independent of the piston unit, spring means of less strength than the first mentioned spring means positioned between said wall unit and said casing resiliently retaining said wall unit in engagement with said piston unit, means operably connecting said displacement member with said wall unit for operation thereof thereby concurrently with simultaneous movement of the piston unit and the wall unit when the piston unit is under power actuation, follow-up control valve mechanism carried by said wall unit to control pressures on opposite sides of said piston unit to render the same active or inactive and including means engageable with said displacement member for direct actuation thereof through the valve mechanism when power actuation of the piston unit fails, and manually operable means operably connected with said valve mechanism for operation thereof thereby for pressure actuation of said piston unit and to move said valve mechanism and thereby said wall unit and said displacement member independently of said piston unit upon failure of pressure actuation of the piston unit.

10. A brake booster mechanism in accordance with claim 9 in which the means operably connecting the displacement member with the wall unit comprising a mechanical lever system between the wall unit and the displacement member to actuate the displacement member is in the wall unit and between said wall unit and said valve mechanism to effect hydraulic reaction of the displacement member to the valve mechanism and thereby to the manually operable means for brake reaction feel in the manually operable means.

11. A brake booster mechanism in accordance with claim 9 in which the said piston unit and the said independent wall unit cooperate to form a chamber adapted for connection to a source of pressure less than atmosphere, with seal means disposed between the wall unit and the piston unit to maintain said chamber against leakage therefrom, movement of said wall unit relative to said piston unit effecting spatial separation at the seal means providing thereby a passage for displacement of fluid from one side to the other of the wall unit without compression of fluid in the casing.

References Cited in the file of this patent

UNITED STATES PATENTS

| | | |
|---|---|---|
| 2,130,799 | Hofstetter | Sept. 20, 1938 |
| 2,642,165 | Banker | June 16, 1953 |

FOREIGN PATENTS

| | | |
|---|---|---|
| 467,688 | Great Britain | June 22, 1937 |